(12) United States Patent
Lam et al.

(10) Patent No.: US 7,603,322 B2
(45) Date of Patent: Oct. 13, 2009

(54) METHOD AND APPARATUS FOR MANAGING A KEY MANAGEMENT SYSTEM

(75) Inventors: Chui-Shan Teresa Lam, Missouri City, TX (US); Jameel Ur Rahman Syed, Houston, TX (US)

(73) Assignee: Dexa Systems, Inc., Houston, TX (US)

( * ) Notice: Subject to any disclaimer, the term of this patent is extended or adjusted under 35 U.S.C. 154(b) by 158 days.

(21) Appl. No.: 11/647,841

(22) Filed: Dec. 29, 2006

(65) Prior Publication Data

US 2007/0217613 A1    Sep. 20, 2007

Related U.S. Application Data

(62) Division of application No. 10/082,758, filed on Feb. 25, 2002, now Pat. No. 7,251,635.

(51) Int. Cl.
*G06Q 20/00* (2006.01)
(52) U.S. Cl. ........................................ 705/71
(58) Field of Classification Search .................... 705/59
See application file for complete search history.

(56) References Cited

U.S. PATENT DOCUMENTS

| | | | |
|---|---|---|---|
| 5,373,561 A | | 12/1994 | Haber et al. |
| 5,495,533 A | * | 2/1996 | Linehan et al. ............. 713/155 |
| 5,499,298 A | | 3/1996 | Narasimhalu et al. |
| 5,673,316 A | | 9/1997 | Auerbach et al. |
| 5,892,900 A | | 4/1999 | Ginter et al. |
| 6,009,177 A | | 12/1999 | Sudia |
| 6,035,402 A | | 3/2000 | Vaeth et al. |
| 6,047,374 A | | 4/2000 | Barton |
| 6,157,723 A | | 12/2000 | Schultz |
| 6,301,585 B1 | | 10/2001 | Milne |
| 6,351,812 B1 | | 2/2002 | Datar et al. |
| 6,370,250 B1 | | 4/2002 | Stein |
| 6,658,568 B1 | | 12/2003 | Ginter et al. |
| 6,735,582 B2 | * | 5/2004 | Fritsche et al. ................. 707/1 |
| 6,757,903 B1 | | 6/2004 | Havemose |
| 6,792,424 B1 | | 9/2004 | Burns et al. |
| 2001/0019614 A1 | | 9/2001 | Madaukh |
| 2001/0026619 A1 | | 10/2001 | Howard, Jr. et al. |

FOREIGN PATENT DOCUMENTS

EP    1041767 A2    10/2000

(Continued)

OTHER PUBLICATIONS

International Search Report; Jul. 29, 2003 (5 Pages).

(Continued)

*Primary Examiner*—Calvin L Hewitt, II
*Assistant Examiner*—Zeshan Qayyum
(74) *Attorney, Agent, or Firm*—Osha • Liang LLP (57) ABSTRACT

A network system for key management, including a server, a key management system providing process logic for key management system management located on the server, a key management system storage providing a secure data storage for the key management system, an application using the key management system to manage an application key, and an interface providing a means for managing the key management system.

6 Claims, 7 Drawing Sheets

FOREIGN PATENT DOCUMENTS

| | | |
|---|---|---|
| WO | WO 00/19652 A1 | 4/2000 |
| WO | WO 01/17160 A1 | 3/2001 |

OTHER PUBLICATIONS

NCSA HDF5 Software Library and Utilities; hdf.ncsa.uiuc.edu/HDF5/doc/Glossary.html; Copyright 2004 by the Board of Trustees of the University of Illinois (2 pages).

PGP Freeware for Windows95, windows 98—Users Guide Version 7.0 Jan. 2001, Network Associates (246 pages).

ISA/European Patent Office, PCT Invitation to Pay Additional Fees for PCT/US03/05767, Jul. 25, 2003, 5 pages.

nCipher Corporation, Ltd.; "Secure Execution Engine (S.E.E.) White Paper;" Copyright 2001; nCipher Corporation Limited; 12 pages.

nCipher Inc.; "Strengthen and Manage the Security of Your Public Key Infrastructure with nCipher;" Copyright 2001; nCipher Inc.; 8 pages.

nCipher, Inc. "nShield Hardware Security Module;" Copyright 2001; nCipher Inc., 2 pages.

nCipher Corporation Limited; "nCipher Security World White Paper;" Copyright 2001; nCipher Corporation Limited; 12 pages.

International Search Report dated Jan. 19, 2004 (9 pages).

L. Opyrchal, et al.; "Efficient Object Serialization in Java"; Publication No. XP-002242373; Department of Electrical Engineering and Computer Science, University of Michigan; 1999 (6 pages).

Z. Canela, et al.; "Integrating Web-Based User Interfaces In TMN Systems"; pp. 110-119; Alcatel Alsthom Corporate Research Center, France; 1998 IEEE.

T. Greanier; "Discover the Secrets of the Java Serialization API"; Jul. 2000; Articles Index No. XP-002262884 (5 pages).

\* cited by examiner

METHOD AND APPARATUS FOR MANAGING A KEY MANAGEMENT SYSTEM

CROSS-REFERENCE TO RELATED APPLICATIONS

This application is a divisional of U.S. patent application Ser. No. 10/082,758, filed Feb. 25, 2002 and entitled "Method and System for Managing a Key Management System," which claims benefit of U.S. non-Provisional application Ser. No. 10/037,153 filed Dec. 21, 2001, entitled "Method and System for Initializing a Key Management System," in the names of Chui-Shan Teresa Lam and Jameel ur Rahman Syed.

BACKGROUND OF INVENTION

Connection of company networks to the Internet has resulted in a requirement for increased network security. This has resulted in some software systems, i.e., Financial Software Systems, requiring security information as part of their operation. Security information includes such information as encryption/decryption keys for encrypted databases, administrator passwords to access external resources such as a directory server, etc. Security information is typically stored in a configuration file that is accessible by the software systems.

While security information is used to ensure the security of particular software systems and the data they use, security information itself is typically not secure. Security information typically stored in a configuration file is in "clear text", i.e., text in ASCII format. However, some software systems include devices to safeguard security information, such as storing security information in encrypted form. While this protects the security information when it is not being used, storing the information in encrypted form does not protect the security information when it is accessed. When security information is accessed by a particular software system, the security information must first be decrypted prior to being used. During this time, the security information is in clear text and thus is exposed.

To protect security information, software system operators typically use Hardware Security Modules (HSM). HSM physically protect security information by providing tamper-resistant security information storage. Additionally, HSM perform functions such as security information generation, security information backup, security information management, etc. Security information inside an HSM is typically accessed by a proprietary software interface.

Figure 1:
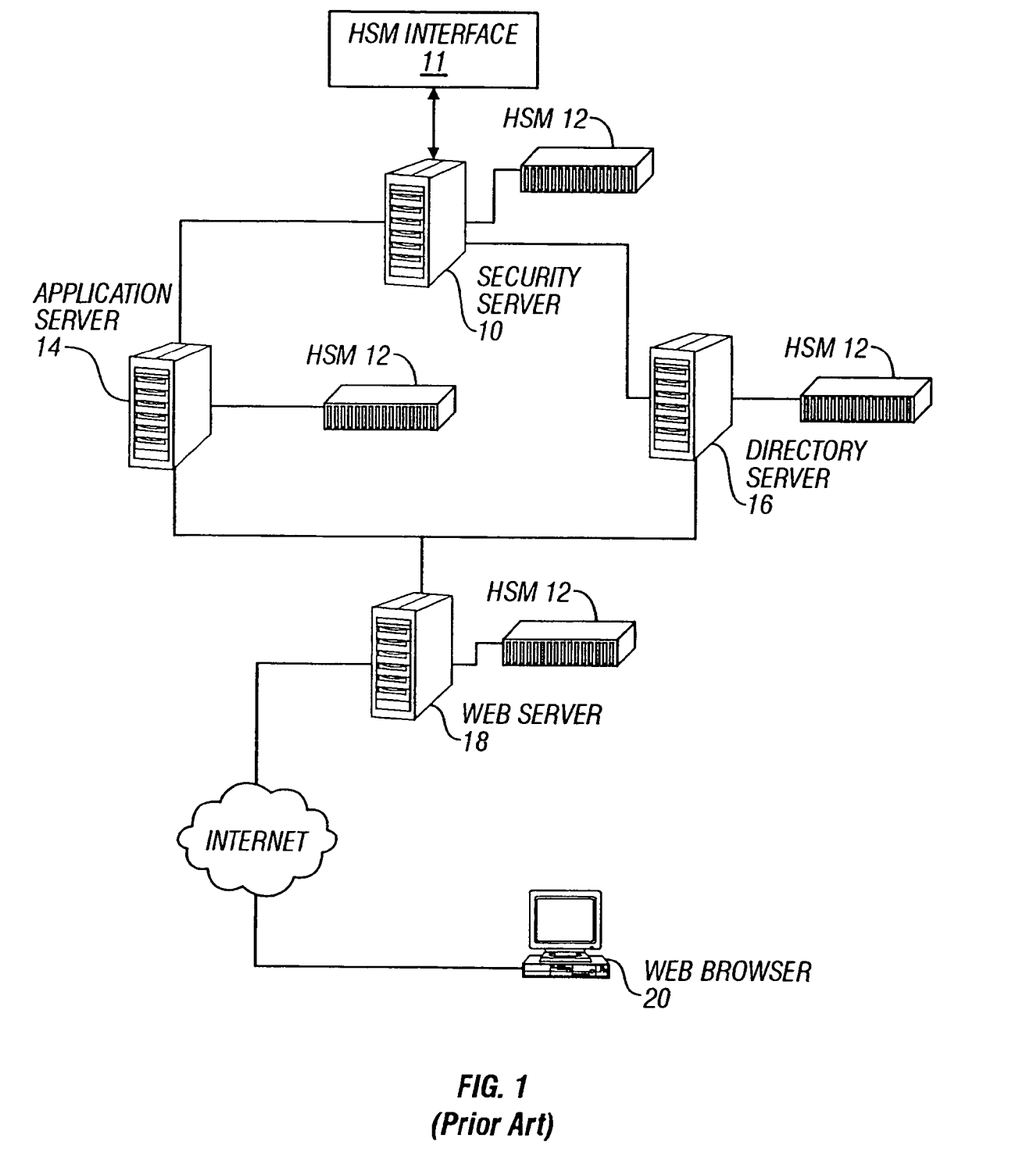
FIG. 1 illustrates a typical network system using Hardware Security Modules (HSM).

FIG. 1 illustrates a typical network system using HSM. The network system has a security server (10) that contains root security information. The root security information allows a user with that information to access any resource on the network. Security information used by the security server is stored on an HSM (12). Additionally, the security server (10) runs the HSM interface that allows the security server to control all HMS (12) on the network. The network system may also have an application server (14) and a directory server (16). The application server (14) typically runs the business logic for a server-based application. The directory server typically runs a directory service. One task performed by the directory service is enabling a user to locate hosts and services on a network. The application server (14) and the directory server (16) also both store security information in HSM (12). Finally, the network system contains a web server (18).

The web server (18) typically runs server software that uses HyperText Transfer Protocol (HTTP) to serve up HyperText Mark-up Language (HTML) documents and any associated files and scripts when requested by a client, such as a Web browser (20). The web server (18) stores security information in an HSM (12).

When a web browser (20) is running a web application via a web server (18) and an application server (14), there may be a request to access sensitive data such as financial data located on the application server (14). The application server (14) on behalf of the web browser (20) requests some security information from the HSM (12). The security information on the HSM (12) is then accessed via the HSM Interface (11).

SUMMARY OF INVENTION

In general, in one aspect, the invention relates to a network system for key management, comprising a server, a key management system providing process logic for key management system management located on the server, a key management system storage providing a secure data storage for the key management system, an application using the key management system to manage an application key, and an interface providing a means for managing the key management system.

In general, in one aspect, the invention relates to a network system for key management, comprising a server, a key management system providing process logic for key management system initialization located on the server, a key management system storage providing a secure data storage for the key management system, an application using the key management system to manage an application key, an interface providing a means for inputting data into the key management system, and a client computer operatively connected to the server, wherein the client computer comprises a user interface to manage the key management system.

In general, in one aspect, the invention relates to a method for retrieving a value secured in a key management system comprising receiving a request for the value secured in the key management system, searching for a key corresponding to the value in a decoded key list, and retrieving a tuple corresponding to the value, if the key corresponding to the value is in the decoded key list.

In general, in one aspect, the invention relates to a method for retrieving a value secured in a key management system comprising receiving a request for the value secured in the key management system, retrieving a serialized file from a key management system storage, de-serializing the serialized file to produce a de-serialized file, decoding an encoded key list in the de-serialized file to produce a decoded key list, searching for a key corresponding to the value in the decoded key list, inputting a key encryption key into the key management system, hashing the key encryption key to produce a key encryption key hash, comparing the key encryption key hash to a hashed key encryption key in the de-serialized file, decrypting a secret token in the de-serialized file using the key encryption key if the key encryption key hash is equal to the hashed key encryption key in the de-serialized file to produce at least one tuple, storing the at least one tuple in a data structure within the key management system, and retrieving the tuple corresponding to the value, if the key corresponding to the value is in the decoded key list.

In general, in one aspect, the invention relates to a method for changing an existing key encryption key, comprising entering the existing key encryption key, entering a new key encryption key, de-serializing a serialized file producing a de-serialized file, hashing the existing key encryption key producing a hashed key encryption key, comparing the hashed key encryption key to a key encryption key hash in the de-serialized file, decrypting a secret token using the existing key encryption key if the hashed key encryption key equals the key encryption key hash producing a tuple, encrypting the tuple using the new key encryption key producing a new secret token, hashing the new key encryption key producing a new hashed key encryption key, and serializing the new hashed key encryption key and the new secret token to produce a new serialized file.

In general, in one aspect, the invention relates to an apparatus for retrieving a value secured in a key management system comprising means for receiving a request for the value secured in the key management system, means for searching for a key corresponding to the value in a decoded key list, and means for retrieving a tuple corresponding to the value, if the key corresponding to the value is in the decoded key list.

In general, in one aspect, the invention relates to an apparatus for retrieving a value secured in a key management system comprising means for receiving a request for the value secured in the key management system, means for retrieving a serialized file from a key management system storage, means for de-serializing the serialized file producing a de-serialized file, means for decoding an encoded key list in the de-serialized file to produce a decoded key list, means for searching for a key corresponding to the value in the decoded key list, means for inputting a key encryption key into the key management system, means for hashing the key encryption key to produce a key encryption key hash, means for comparing the key encryption key hash to a hashed key encryption key in the de-serialized file, means for decrypting a secret token in the de-serialized file using the key encryption key if the key encryption key hash is equal to the hashed key encryption key in the de-serialized file to produce at least one tuple, means for storing the at least one tuple in a data structure within the key management system, and means for retrieving the tuple corresponding to the value, if the key corresponding to the value is in the decoded key list.

In general, in one aspect, the invention relates to an apparatus for changing an existing key encryption key, comprising means for entering the existing key encryption key, means for entering a new key encryption key, means for de-serializing a serialized file producing a de-serialized file, means for hashing the existing key encryption key producing a hashed key encryption key, means for comparing the hashed key encryption key to a key encryption key hash in the de-serialized file, means for decrypting a secret token using the existing key encryption key if the hashed key encryption key equals the key encryption key hash producing a tuple, means for encrypting the tuple using the new key encryption key producing a new secret token, means for hashing the new key encryption key producing a new hashed key encryption key, and means for serializing the new hashed key encryption key and the new secret token to produce a new serialized file.

Other aspects and advantages of the invention will be apparent from the following description and the appended claims.

DETAILED DESCRIPTION

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to management of a key management system. Further, the invention relates to a method for retrieving data secured within the key management system. Further, the invention relates to methods for managing data secured within the key management system.

Figure 2:
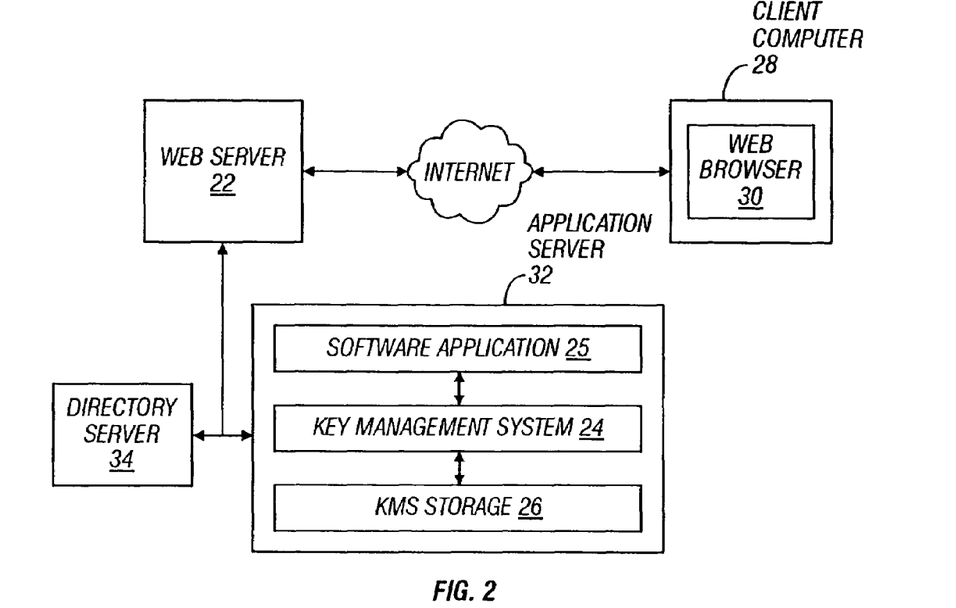
FIG. 2 illustrates a typical network system in accordance with one embodiment of the invention.

FIG. 2 illustrates an exemplary network system in accordance with one or more embodiments of the present invention. The network system typically includes a web server (22), and a client computer (28) containing a web browser (30). Additionally, the web server (22) is typically operatively connected to an application server (32) containing a Key Management System (KMS) (24) and a Key Management System Storage (KMS Storage) (26), and to a directory server (34). The software application (25) represents a generic software application, such as a financial data application, an authentication application, etc. The directory server (34) includes secured data that may be accessed by the software application (25) using authentication information, such as an administrator password. The web server (22) and the web browser (30) typically communicate using Hypertext Transfer Protocol (HTTP) running over Transport Control Protocol/Internet Protocol (TCP/IP). The KMS (24) contains process logic, and the KMS storage (26) provides a secure data storage location, e.g., a hard drive, where information processed by the KMS (24) is stored. Further, the KMS storage (26) is secured by the operating system via file permissions.

In one or more embodiments of the invention, the KMS storage (26) is located on a different computer than the KMS (24). Further, the computers are connected via a secure connection such as a connection using 128-bit encryption running over a Secure Socket Layer (SSL).

While the invention is described according to one embodiment, those skilled in the art will appreciate that the KMS (24) and KMS storage (26) may be distributed across the network system.

Figure 3:
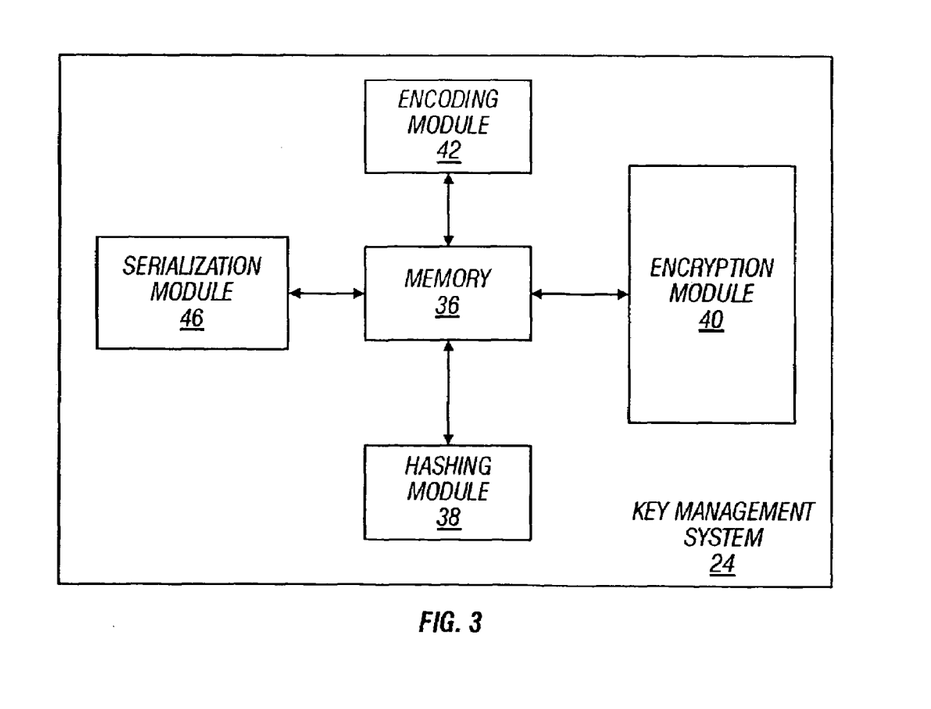
FIG. 3 illustrates a Key Management System (KMS) in accordance with one embodiment of the invention.

FIG. 3 illustrates a Key Management System (KMS) in accordance with one or more embodiments of the present invention. The KMS (24) includes a memory (36), a hashing module (38), an encryption module (40), an encoding module (42), and a serialization module (46). The memory (36) is a random access memory (RAM) subsystem in which frequently used data values are duplicated for quick access. Specifically, within the KMS (24), the memory (36) stores data initially sent to the KMS (24) prior to processing. The hashing module (38) hashes a Key Encryption Key (KEK) within the KMS (24). By applying a hashing function to a piece of data, the resulting data is a reorganized version of the original data. Additionally, hash functions used to secure data are typically designed such that they cannot be "reverse engineered." The purpose of hashing the KEK is to provide a means to store the KEK in a secure format. In one embodiment of the present invention, MD5 is used as the hash function. Those skilled in the art will appreciate that different hashing functions may be employed, e.g., MD2, MD4, etc.

The encryption module (40) contains encryption and decryption tools. The encryption tools include tools for key generation and tools for encryption. The key generation tools typically use a randomly generated seed as part of the input to the key generation tool. Specifically, within the KMS (24), the encryption module (40) includes process logic that generates the random seed for input to the key generation tool. The generated keys are used to access secure systems and/or applications such as a directory server.

The encryption tool obtains data to be encrypted from the memory (36), or KMS generated keys from the key generation tools within the encryption module (40), and encrypts them using a specified encryption function. The encryption module (40) uses a KEK as the encryption key. In one embodiment of the present invention, the KEK includes three distinct parts: (1) a KEK Pin, (2) a KEK Salt, and (3) a KEK Iteration. Constraints may be placed on all three parts of the KEK. For example, the KEK Pin may have a requirement to be at least 10 characters with a minimum of 3 numbers (N) and 3 letters (L), e.g., KEK Pin: NNNLNLLNLN. Depending on the encryption algorithm used, the KEK may have greater or fewer than three parts. Additionally, some encryption algorithms may also apply constraints to individual KEK parts. For example, one embodiment of the present invention uses PBE with MD5 in combination with Triple Data Encryption Standard (DES) as the encryption algorithm. This algorithm imposes a constraint on the KEK salt by limiting the KEK salt to eight characters. Further, the KEK Iteration is limited to an integer. Those skilled in the art will appreciate that different encryption algorithms or combinations of encryption algorithms may be used in conjunction with the present invention.

In one embodiment of the present invention, the encryption module uses a symmetric algorithm, e.g., Triple Data Encryption Standard (DES). Symmetric algorithms rely on encrypting and decrypting data using the same encryption key. Thus, a KEK is used to encrypt and decrypt data within the KMS.

In another embodiment of the present invention, the encryption module uses an asymmetric algorithm, e.g., Rivest-Shamir-Adleman (RSA) algorithm. RSA creates a pair of related keys, one key to encrypt data and another key to decrypt data. Thus, a KEK may be used to encrypt the data and a corresponding Key Decryption Key (KDK) may be used to decrypt the data. The KEK and KDK are created simultaneously using the same algorithm, e.g., RSA algorithm. The key generation tools within the encryption module generate the KEK and KDK using random input either generated by the user or by the key generation tool.

The encoding module (42) converts the data into a binary representation that is 64-bit encoded. Further, the encoding module (42) decodes encoded data.

Typically, encoding is performed to hide the clear text names of the data being encrypted. The serialization module (46) obtains input from the hashing module (38), the encoding module (42), and the encryption module (40) and stores the input in a vector. Once all the data has been received, the serialization module (46) processes the vector to create a serialized file. Serialization is the process of saving an object's state to a sequence of bytes, such that the object may be rebuilt into a live object at some future time. Specifically, within the KMS, the vector is converted into an object within the serialization module (46) and, subsequently, converted into a serialized file. The serialized file allows the data within the vector to persist beyond the time the KMS (24) is active. Additionally, the serialized file may be copied and transferred to another system where the file may be stored as a backup. The process of creating the serialized filed is typically carried out using a Java™ Serialization Application Program Interface (API), however, one skilled in the art will appreciate that any interface may be used to create a serialized file. Additionally, the serialization module (46) also includes functionality to de-serialize serialized files.

Figure 4:
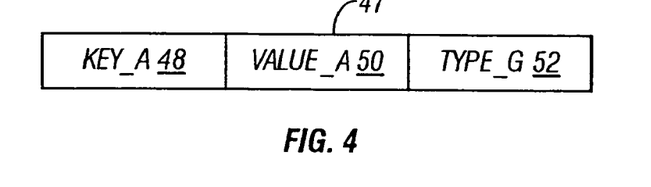
FIG. 4 illustrates a 3-tuple in accordance with one embodiment of the invention.

The KMS (24) uses three main data structures: a tuple, a vector, and a serialized file to manage secured data. FIG. 4 illustrates a 3-tuple in accordance with an embodiment of the present invention. The 3-tuple (47) includes three data fields: a key field (48), a value field (50), and a type field (52). The key field (48) contains an identifying name of a value, e.g., Admin_Password. The value field (50) contains a value identified by the name in the key field (48). The type field (52) may contain either "USER" or "GENERATED" "USER" corresponds to a value in the value field (50) that was entered by the user. "GENERATED" corresponds to a value in the value field (50) that was generated by the KMS, specifically the key generation tool in the encryption module. Those skilled in the art will appreciate that other terms may be used in the value field (50) and that the terms are not limited to only "USER" and "GENERATED" The three fields are combined to produce a 3-tuple (47). Data input into the KMS is first stored as a 3-tuple (47) within the memory prior to processing.

Figure 5:
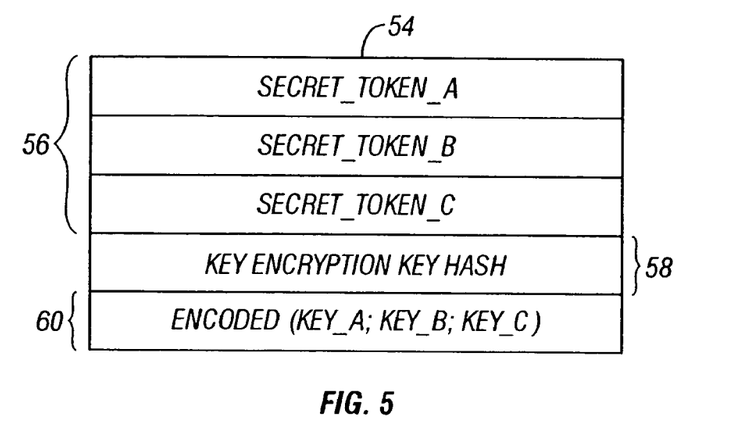
FIG. 5 illustrates a vector in accordance with one or more embodiment of the invention.

FIG. 5 illustrates a vector in accordance with one or more embodiments of the present invention. A vector is a data structure defined as a one-dimensional array, where the array is a set of items arranged in a single column or row. Additionally, the vector data structure can dynamically grow based on the size of the items within the set. Specifically, a vector (54) with a KMS includes three distinct portions: a secret token portion (56), a KEK Hash portion (58), and an encoded key portion (60). The secret token portion (56) contains all the encrypted 3-tuples. Each encrypted 3-tuple is, herein, referred to as a secret token. In one embodiment of the present invention, secret tokens are stored in a random order within the secret token portion (56). Following the secret token portion (56) is the KEK Hash portion (58). The KEK Hash portion (58) holds the result of applying the hash function to the KEK, i.e., the KEK Hash. The KEK Hash is output from the Hashing Module. The final portion is the Encoded Key Portion (60),which contains an encoded list of Keys (from the Key field in the 3-tuple). In one embodiment, each key is 64-bit encoded and separated by a semi-colon. In another embodiment, the keys are combined into a list and the list is subsequently encoded. For example, if there were three keys, then the encoded key portion (60) may have the following content: ENCODED (Key_A; Key_B; Key_C). Those skilled in the art will appreciate that the encoded keys may be separated in different manners. Encoded keys are output from the encoding module, and then stored in the vector (54). In one embodiment of the present invention, the list of Keys may be placed in a random order prior to encoding.

A serialized file is a flat-file. A flat-file is a file that consists of a single record type in which there is not embedded structure information that governs relationships between the records. Specifically, serialized flat-files may be "flattened" by the Sun® Microsystem's Java™ Serialization Application Program Interface (API) such that they may be rebuilt at some future time. The serialization module takes a vector as input and produces a serialized file as output.

Figure 6:
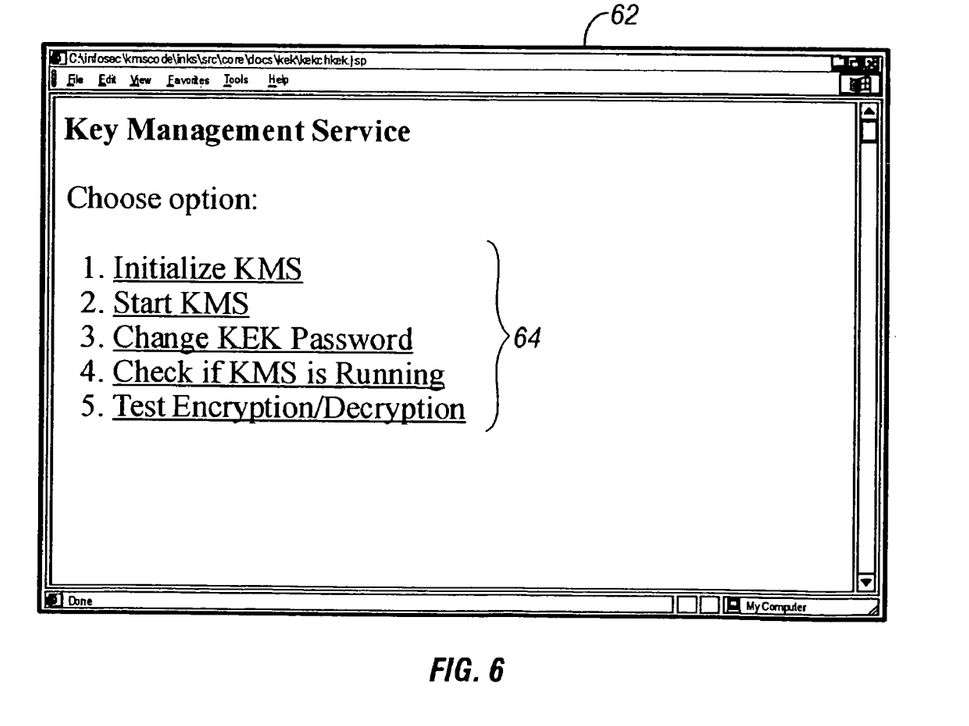
FIG. 6 illustrates a graphical user interface (GUI) in accordance with one embodiment of the invention.

FIG. 6 illustrates a graphical user interface (GUI) in accordance with one embodiment of the invention. The GUI (62) includes five hyperlinked menu options (64). The menu options include: Initialize MKS, Start KMS, Change KEK Password, Check if KMS is Running, and Test Encryption/Decryption.

Details regarding the Initialize KMS menu option are disclosed in the co-owned patent application Ser. No. 10/037,153 filed Dec. 21, 2001 entitled "Method and System for Initializing a Key Management System", in the names of Chui-Shan Teresa Lam and Jameel ur Rahman Syed.

Figure 7:
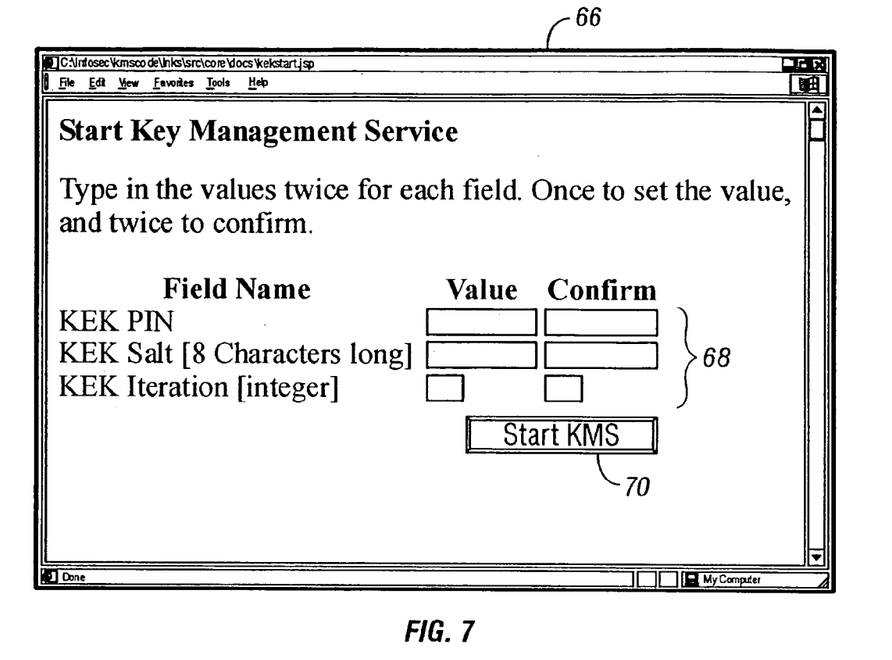
FIG. 7 illustrates a GUI for the Start KMS menu option in accordance with one embodiment of the invention.

FIG. 7 illustrates a GUI for the Start KMS menu option in accordance with one embodiment of the invention. The GUI (66) includes a series of text input fields (68) that correspond the various parts of the KEK, e.g. KEK PIN, KEK Salt, KEK Iteration, etc. In this particular embodiment, each part is entered twice to ensure that the value was correctly entered. Once all parts of the KEK are entered into the corresponding text input fields (68), a user may click the "Start KMS" button (70) to start the KMS (24).

Figure 8:
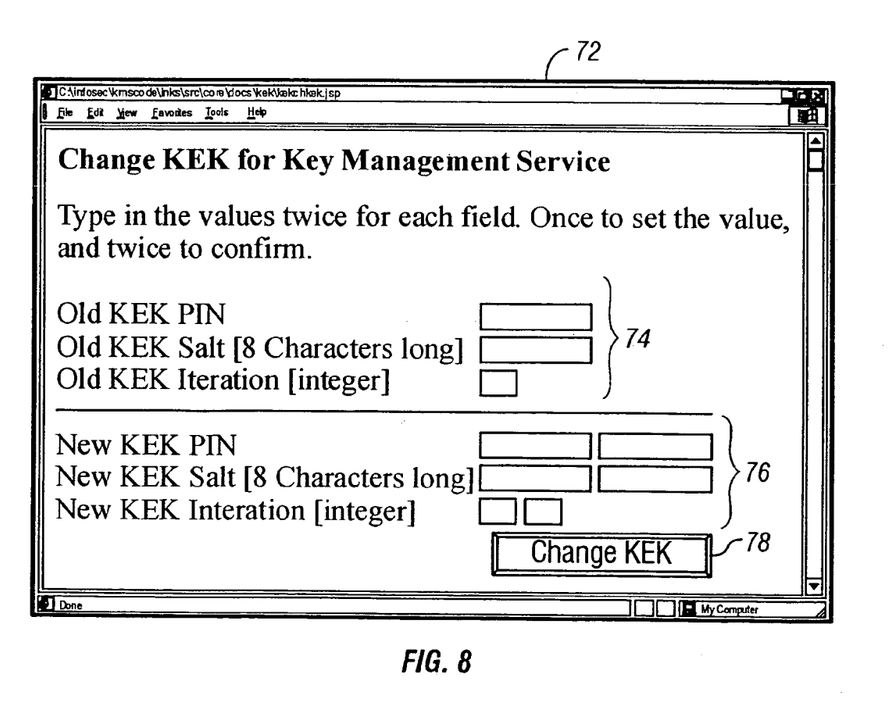
FIG. 8 illustrates a GUI for the Change KEK Password menu option in accordance with one embodiment of the invention.

FIG. 8 illustrates a GUI for the Change KEK Password menu option in accordance with one embodiment of the invention. The GUI (72) includes two sets of text input fields: (1) a series of text input fields corresponding to the OLD KEK (74), and (2) a series of text input fields corresponding to the NEW KEK (76). If a user wishes to change the KEK, she inputs all the parts of the OLD KEK into the series of text input fields corresponding to the OLD KEK (74), and enters all parts of the NEW KEK into series of text input fields corresponding to the NEW KEK (76). Once all the parts of the OLD KEK and the NEW KEK have been entered, the user may click the "Change KEK" button (78). The process that takes places within the KMS (24) once the "Change KEK" button (78) is clicked is described below.

Figure 9:
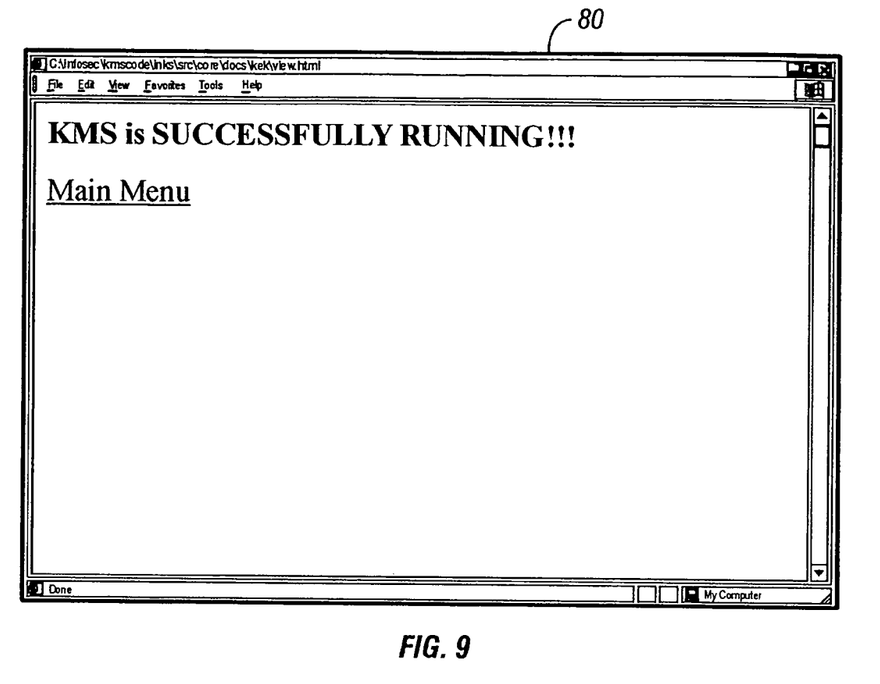
FIG. 9 illustrates a GUI for the Check if KMS is Running menu option in accordance with one embodiment of the invention.

FIG. 9 illustrates a GUI for the Check if KMS is Running menu option in accordance with one embodiment of the invention. The GUI (80) displays a text message indicating that the KMS (24) is running or that it is not running. This menu option is typically used as a diagnostic tool by a user to verify that the KMS (24) is operating correctly.

Figure 10:
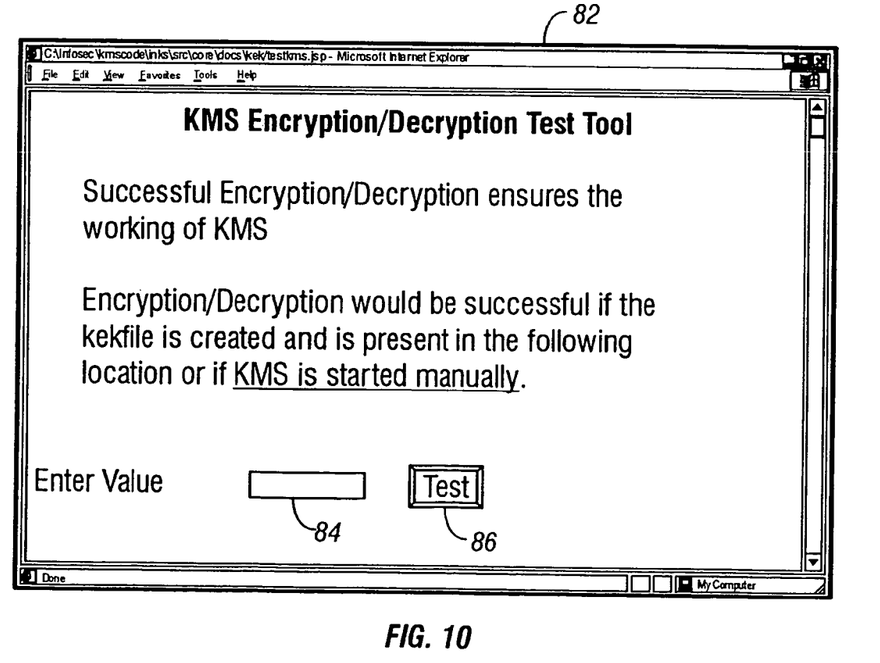
FIG. 10 illustrates a GUI for the Test Encryption/Decryption menu option in accordance with one embodiment of the invention.

FIG. 10 illustrates a GUI for the Test Encryption/Decryption menu option in accordance with one embodiment of the invention. The GUI (82) includes a text input field (84) and a "Test" button (86). Similar to the Check if KMS is Running menu option, the Test Encryption/Decryption menu option is used as a diagnostic tool by a user to verify that the KMS (24) is operating correctly. Specifically, the Test Encryption/Decryption menu option allows the user to verify if the encryption and decryption functions within the KMS (24) are operating correctly. The user initially enters a string into the text input field (84). The user then clicks the "Test" button (86). If the returned value (not shown) is the same as the value origi-nally entered, then the encryption and decryption functions of the KMS (24) are operating correctly. If a value other than the value originally entered into the text input field (84) is returned, then there is a problem with the encryption and/or decryption functions within the KMS (24). If this occurs, the user may take appropriate actions to fix the problem.

In one embodiment of the invention, the GUI is a stand alone interface operating in a runtime environment. In another embodiment of the invention, the GUI is integrated into a web browser.

Referring again to FIG. 2, consider the following scenario. A network operator adds a directory server (34) to an existing network infrastructure, e.g. a web server (22) and application server (32). The application server (32) is running a software application (25) that is used to verify remote web users. The software application (25) stores user name and password information in encrypted form on the directory server (34) running a Lightweight Directory Application Protocol (LDAP)-compliant directory service. Thus, the software application (25) requires an administrator level username and password to logon to the LDAP-compliant directory service running on the directory server (34). Additionally, the software application (25) requires the decryption keys to decrypt the data on the directory server (34). The invention allows a user to retrieve and use all required access data, i.e., administrator username, administrator password, decryption key, from the KMS storage (26) via the KMS (24). The user initially enters the KEK into the KMS (26) GUI. The KMS (24) then proceeds to verify the KEK and retrieve the required access data. This process is described in greater detail below.

Figure 11:
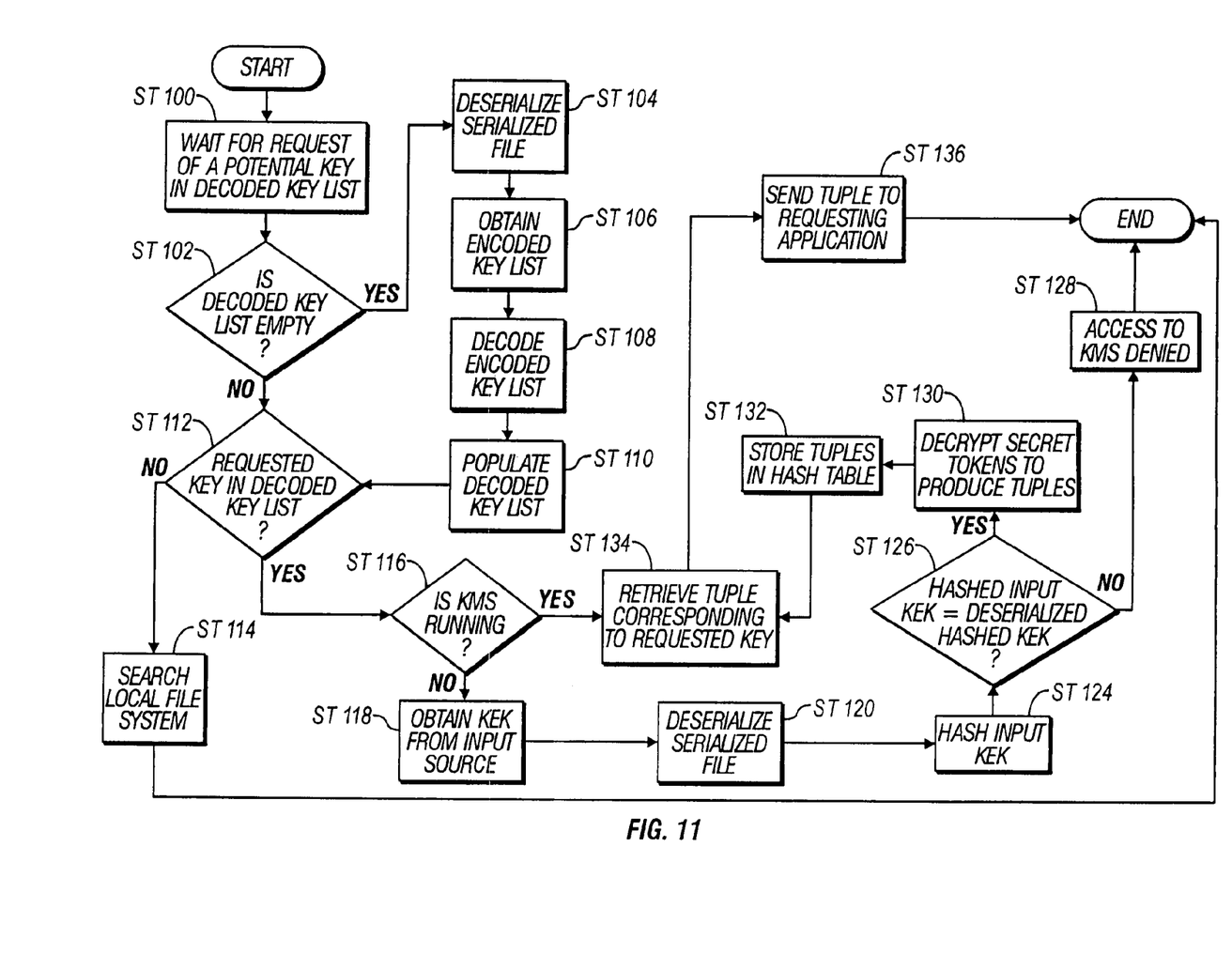
FIG. 11 illustrates, in flow chart form, the typical steps involved in retrieving required access data from a Key Management System in accordance with one embodiment of the invention.

FIG. 11 illustrates, in flow chart form, the typical steps involved in retrieving required access data from a Key Management System in accordance with one embodiment of the invention. Initially, the KMS receives a request for a key from an application (Step 100). The KMS first determines if a decoded key list is empty (Step 102). If the decoded key list is empty (Step 102), then a serialized file is retrieved from KMS storage and de-serialized (Step 104). An encoded key list is subsequently obtained from the de-serialized file (Step 106), and decoded (Step 108). The information obtained from the decoding step is used to populate the decoded key list (Step 110). If the decoded key list is not empty (Step 102), or once the decoded key list is populated as outlined in Steps 104 to 110 above, a search is performed to determine if the requested key is present in the decoded key list (Step 112).

If the requested key is not present in the decoded key list (Step 112), then the local file system is searched for the requested key and corresponding access data i.e., passwords, etc. (Step 114). If the requested key is in the decoded key list (Step 112), then a determination is made if the KMS is running (Step 116).

If the KMS is not running (Step 116), the KMS obtains a KEK from an input source, i.e., input by user, configuration file, etc. (Step 118). During initialization, the KMS may be configured to start, using a configuration file, when the server is started. Details for configuration are disclosed in the co-owned patent application Ser. No. 10/037,153 entitled "Method and System for Initializing a Key Management System," filed Dec. 21, 2001 in the names of Chui-Shan Teresa Lam and Jameel ur Rahman Syed. The KMS then proceeds to retrieve and de-serialize a serialized file from the KMS storage specifically using the serialization module (Step 120). The KEK is subsequently hashed by the hashing module (Step 124). The hash of the KEK obtained from the input source is compared to the KEK Hash (Step 126). If the hash of the KEK obtained from the input source is not equal to the KEK Hash, then access to the KMS is denied (Step 128).

If the hash of the KEK obtained from the input source is equal to the KEK Hash, then access to the KMS is granted and the KMS proceeds to decrypt the secret tokens to produce tuples (Step 130). The encryption module is used to decrypt the secret tokens. The tuples are then stored in a hash table data structure created within the memory (Step 132). Those skilled in the art will appreciate that any data structure may be used to store the tuples in the memory. If the KMS is running (Step 116) or once steps 118 through 132 have been completed, the tuple corresponding to the requested key is retrieved (Step 134). The tuple is subsequently forwarded to the requesting application (Step 136).

Figure 12:
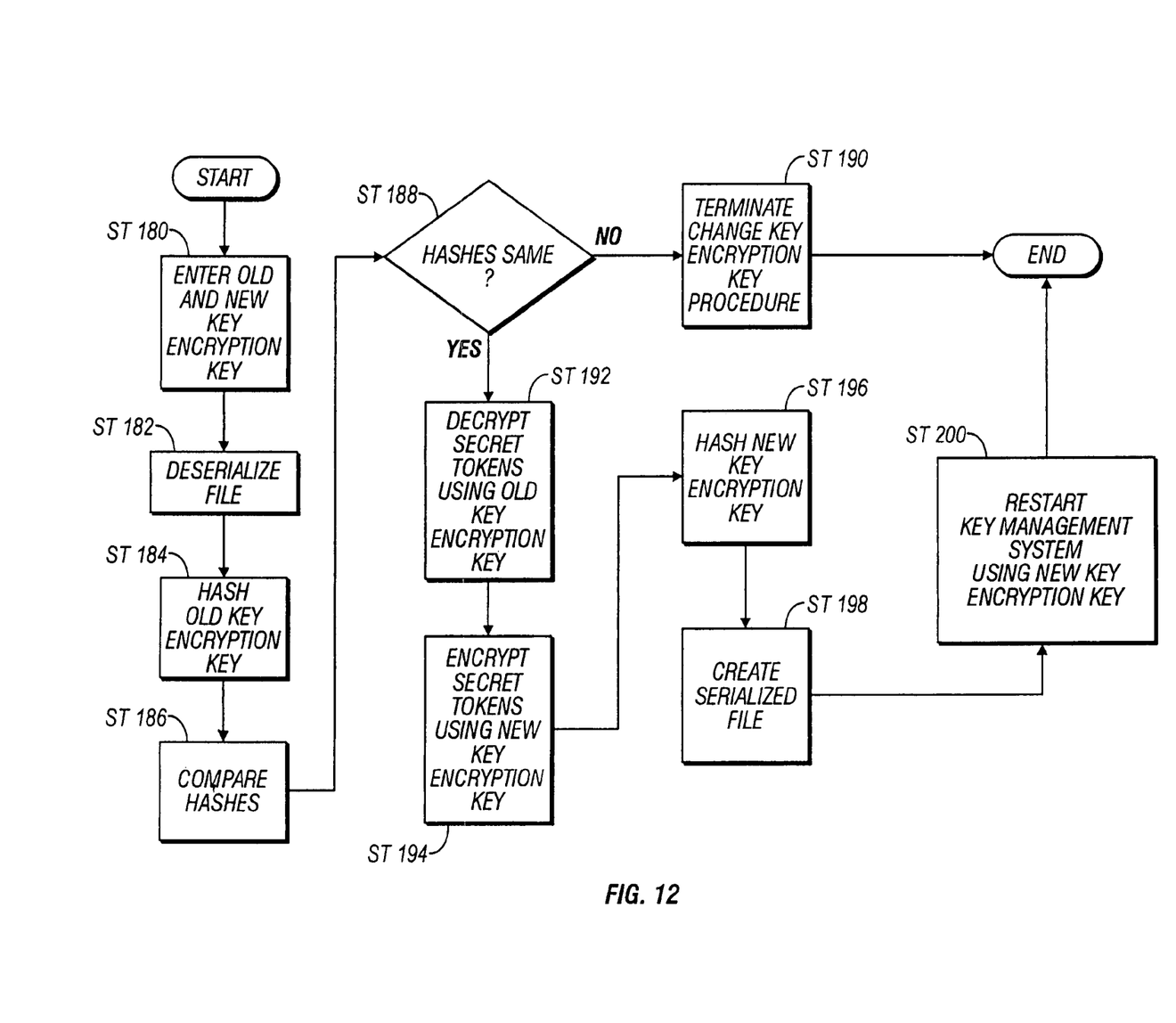
FIG. 12 illustrates the typical steps involved in changing a KEK within a Key Management System in accordance with one embodiment of the invention.

FIG. 12 illustrates the typical steps involved in changing a KEK within a Key Management System in accordance with one embodiment of the invention. A user enters old and new KEK information into a Change KEK for Key Management Service GUI (Step 180). A serialized file associated with the old KEK is de-serialized (Step 182). An old KEK is hashed (Step 184). The old KEK is associated with the old KEK information entered by the user in Step 180. A comparison is made of a hash of the old KEK (as entered in Step 180) and a hashed KEK included in a vector stored in a KMS Storage associated with the KMS (Step 186). A determination is made as to whether the hash of the old KEK entered by the user is the same as the hash of the KEK associated with the vector (Step 188). If the hash of the old KEK entered by the user is not the same as the hash of the KEK associated with the vector, then the procedure may be terminated (Step 190). Alternatively, the user may be prompted to re-enter old and new KEK information. Otherwise, if the hash of the old KEK entered by the user is the same as the hash of the KEK associated with the vector, one or more secret tokens included in the vector are decrypted using the old KEK (Step 192). One or more secret tokens included in the vector are subsequently encrypted using the new KEK (Step 194). The new KEK is hashed (Step 196). A serialized file including the new KEK hash, the secret tokens and the encoded key list is subsequently created (Step 196). The KMS may then be restarted using the new KEK (Step 200). One skilled in the art will recognize that the order and functionality of the steps presented in FIG. 12 may vary in accordance with a particular embodiment of the present invention.

Advantages of the invention may include one or more of the following. In some embodiments, the invention provides a software solution to key management systems. Further, the invention may be integrated into existing network infrastructure without requiring additional hardware. In some embodiments, the invention is scalable to manage keys for multiple applications. In some embodiments, the invention allows sensitive data to be readily backed-up and recovered. In some embodiments of the invention, the keys are never stored as clear text. Further, the invention allows the KMS to be distributed over multiple servers within a network system. Further, the invention allows the KEK to contain multiple portions, e.g., salt, count, integer, such that KEK may be distributed to multiple security officers. In some embodiments, the invention allows the key management system to be modified without replacing or modifying any hardware components. Those skilled in the art can appreciate that the invention may include other advantages and features.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is :

1. A computer readable medium comprising computer executable instructions for retrieving a value secured in a key management system, the instructions, when executed, causing a processor to perform method steps of:

obtaining a decoded key list by decoding an encoded key list, wherein the decoded key list comprises a key corresponding to the value;

receiving a request for the value secured in the key management system from a requesting application, wherein the request comprises the key;

in response to the request for the value, searching for the key in the decoded key list;

determining the key corresponding to the value is in the decoded key list;

obtaining an encrypted tuple, encrypted using a key encryption key associated with a key decryption key, from the key management system using the key, wherein the encrypted tuple comprises the key and the value;

obtaining a tuple corresponding to the value by decrypting the encrypted tuple using the key decryption key;

and providing the tuple corresponding to the value to the requesting application.

2. The computer readable medium of claim 1, wherein the encoded key list is stored in a key management storage located on a second server.

3. The computer readable medium of claim 1, wherein the key management system comprises a graphical user interface.

4. A key management system comprising:

a processor:

a memory comprising computer executable instructions for retrieving a value secured in the key management system, the instructions, when executed, causing the processor to perform method steps of:

obtaining a decoded key list by decoding an encoded key list, wherein the decoded key list comprises a key corresponding to the value;

receiving a request for the value secured in the key management system from a requesting application, wherein the request comprises the key;

searching for the key in the decoded key list in response to the request for the value;

determining the key corresponding to the value is in the decoded key list;

obtaining an encrypted tuple, encrypted using a key encryption key associated with a key decryption key, from the key management system using the key, wherein the encrypted tuple comprises the key and the value;

obtaining a tuple corresponding to the value by decrypting the encrypted tuple using a key decryption key; and providing the tuple corresponding to the value to the requesting application.

5. The apparatus of claim 4, wherein the encoded key list is stored in a key management storage located on a second server.

6. The apparatus of claim 4, wherein the key management system comprises a graphical user interface.

* * * * *